United States Patent
Kondo et al.

(10) Patent No.: US 12,103,556 B2
(45) Date of Patent: Oct. 1, 2024

(54) CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Suzuka Kondo, Nishitokyo (JP); Eiki Kitagawa, Tokyo-to (JP); Shota Fujii, Tokyo-to (JP); Yu Okada, Ichikawa (JP); Takuo Kaneko, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 17/868,015

(22) Filed: Jul. 19, 2022

(65) Prior Publication Data

US 2023/0092364 A1 Mar. 23, 2023

(30) Foreign Application Priority Data

Sep. 17, 2021 (JP) .................. 2021-152312

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 30/12; B60W 30/18163;
(Continued)

(56) References Cited

U.S. PATENT DOCUMENTS

2014/0207325 A1* 7/2014 Mudalige ........... B62D 15/0255
701/25
2019/0300053 A1 10/2019 Mizoguchi
(Continued)

FOREIGN PATENT DOCUMENTS

JP 2015-152386 A 8/2015
JP 2018-049445 A 3/2018
(Continued)

OTHER PUBLICATIONS

Machine Translation of JP2015-152386 retrieved from Espacenet on Apr. 20, 2024 (Year: 2024).*

*Primary Examiner* — Thomas Ingram
(74) *Attorney, Agent, or Firm* — Oliff PLC (57) ABSTRACT

A vehicle controller includes a processor configured to: determine a driving plan when a lane change from a host vehicle lane to another lane is requested. The driving plan represents travel behavior of a vehicle until completion of the lane change and satisfies a safety condition that the vehicle will collide with none of objects around the vehicle detected from a sensor signal obtained by a sensor mounted on the vehicle. The processor is further configured to: set a completion condition indicating a position or time at which the completion of the lane change is required, determine whether the completion condition is satisfied when the vehicle is driven according to the driving plan, control the vehicle to make the lane change according to the driving plan when the completion condition is satisfied, and restrict execution of the lane change when the completion condition is not satisfied.

7 Claims, 7 Drawing Sheets

(51) Int. Cl.
*B60W 30/095* (2012.01)
*B60W 30/12* (2020.01)
*B60W 30/18* (2012.01)
*B60W 40/02* (2006.01)
*B60W 50/10* (2012.01)
*G06V 20/58* (2022.01)

(52) U.S. Cl.
CPC ...... *B60W 30/12* (2013.01); *B60W 30/18163* (2013.01); *B60W 40/02* (2013.01); *B60W 50/10* (2013.01); *B60W 60/0015* (2020.02); *B60W 60/00274* (2020.02); *G06V 20/58* (2022.01); *B60W 2420/403* (2013.01); *B60W 2552/10* (2020.02); *B60W 2552/30* (2020.02)

(58) Field of Classification Search
CPC .. B60W 40/02; B60W 50/10; B60W 60/0015; B60W 60/00274; B60W 2420/403; B60W 2552/10; B60W 2552/30; B60W 50/12; B60W 2540/20; G06V 20/58; G06V 20/588

See application file for complete search history.

(56) References Cited

U.S. PATENT DOCUMENTS

| | | |
|---|---|---|
| 2020/0180639 A1 | 6/2020 | Mizoguchi |
| 2020/0262448 A1 | 8/2020 | Li et al. |
| 2021/0039649 A1* | 2/2021 | Yu .......................... G06V 20/58 |
| 2021/0370946 A1* | 12/2021 | Taniguchi .............. G08G 1/167 |
| 2023/0021000 A1* | 1/2023 | Okonogi ............... B60W 10/04 |
| 2024/0126702 A1* | 4/2024 | Dechene ............. G06F 12/0882 |

FOREIGN PATENT DOCUMENTS

| | | |
|---|---|---|
| JP | 2019-172239 A | 10/2019 |
| JP | 2020-095336 A | 6/2020 |
| JP | 2020-135885 A | 8/2020 |

\* cited by examiner

CONTROLLER, METHOD, AND COMPUTER PROGRAM FOR VEHICLE CONTROL

FIELD

The present invention relates to a controller, a method, and a computer program for vehicle control.

BACKGROUND

A technique to cause a vehicle to make a lane change in autonomous driving control of the vehicle has been proposed (see Japanese Unexamined Patent Publications JP2020-135885A and JP2020-095336A).

A determination method in a lane change disclosed in JP2020-135885A includes obtaining first and second planned trajectories of a driverless vehicle in a preset period, during a lane change of the vehicle. The first planned trajectory is for traveling to a target lane of the lane change whereas the second planned trajectory is for traveling to a lane where the vehicle is located at the start of the lane change. The method further includes predicting a predicted trajectory of at least one obstacle in a preset area around the vehicle in the preset period, based on a driving state of the obstacle; and determining a travel motion of the vehicle, based on the first and second planned trajectories and the predicted trajectory of the obstacle.

A device for assisting in autonomous driving disclosed in JP2020-095336A determines whether a lane-restricted section is set on a travel lane of a main road nearer than an entrance to a diverging lane, when a target path along which a host vehicle is automatically driven is set from the travel lane to the diverging lane. When it is determined that a lane-restricted section is set, the device executes a lane change control to guide the host vehicle to an adjoining passing lane before reaching the start point of the lane-restricted section. After the lane change to the adjoining passing lane and the passage through the lane-restricted section, the device further determines whether entry into the diverging lane is possible, when causing the host vehicle to make a lane change to the diverging lane. When it is determined that the entry is impossible, the device maintains travel on a host vehicle lane.

SUMMARY

In some cases, it may be difficult to make a lane change as planned. In such a case, the actual behavior of the vehicle will differ from that expected by its driver, which may give the driver a strange feeling.

It is an object of the present invention to provide a vehicle controller that can prevent a driver from feeling the behavior of his/her vehicle strange when the vehicle makes a lane change automatically.

According to an embodiment, a vehicle controller is provided. The vehicle controller includes a processor configured to: detect an object in an area around a vehicle, based on a sensor signal obtained by a sensor mounted on the vehicle, determine a driving plan for controlling a lane change from a host vehicle lane being traveled by the vehicle to another lane when an instruction by a driver of the vehicle, a travel situation of the vehicle, or a road structure around the vehicle causes a request for the lane change. The driving plan represents travel behavior of the vehicle until completion of the lane change and satisfies a safety condition that the vehicle will collide with none of objects around the vehicle. The processor is further configured to: set a completion condition indicating a position or time at which the completion of the lane change is required, based on the time elapsed since the instruction by the driver, the structure of a road being traveled by the vehicle, or the situation of the road, determine whether the completion condition is satisfied when the vehicle is driven according to the driving plan, control the vehicle to make the lane change according to the driving plan when the completion condition is satisfied, and restrict execution of the lane change when the completion condition is not satisfied.

The processor of the vehicle controller preferably relaxes the completion condition when the driving plan satisfies a high-level safety condition than when the driving plan does not satisfy the high-level safety condition. The high-level safety condition requires a higher level of safety of the vehicle than the safety condition.

When the instruction by the driver causes the request for the lane change, the processor of the vehicle controller preferably sets the completion condition, based on the time elapsed since the instruction; and when the travel situation of the vehicle or the road structure around the vehicle causes the request for the lane change, the processor preferably sets the completion condition, based on the position at which the completion of the lane change is required.

Alternatively, the processor of the vehicle controller preferably is further configured to determine the degree of restriction of the lane change, depending on which of the time elapsed since the instruction by the driver, the structure of the road being traveled by the vehicle, or the situation of the road the completion condition is based on.

Alternatively, the processor of the vehicle controller preferably determines different degrees of restriction of the lane change for the case in which the completion condition is determined not to be satisfied and may be satisfied after a predetermined period and the case in which the completion condition is determined not to be satisfied and cannot be satisfied after the predetermined period.

According to another embodiment, a method for vehicle control is provided. The method includes detecting an object in an area around a vehicle, based on a sensor signal obtained by a sensor mounted on the vehicle; and determining a driving plan for controlling a lane change from a host vehicle lane being traveled by the vehicle to another lane when an instruction by a driver of the vehicle, a travel situation of the vehicle, or a road structure around the vehicle causes a request for the lane change. The driving plan represents travel behavior of the vehicle until completion of the lane change and satisfies a safety condition that the vehicle will collide with none of objects around the vehicle. The method further includes setting a completion condition indicating a position or time at which the completion of the lane change is required, based on the time elapsed since the instruction by the driver, the structure of a road being traveled by the vehicle, or the situation of the road; determining whether the completion condition is satisfied when the vehicle is driven according to the driving plan; controlling the vehicle to make the lane change according to the driving plan when the completion condition is satisfied; and restricting execution of the lane change when the completion condition is not satisfied.

According to still another embodiment, a non-transitory recording medium that stores a computer program for vehicle control is provided. The computer program includes instructions causing a processor mounted on a vehicle to execute a process including: detecting an object in an area around the vehicle, based on a sensor signal obtained by a sensor mounted on the vehicle; and determining a driving plan for controlling a lane change from a host vehicle lane being traveled by the vehicle to another lane when an instruction by a driver of the vehicle, a travel situation of the vehicle, or a road structure around the vehicle causes a request for the lane change. The driving plan represents travel behavior of the vehicle until completion of the lane change and satisfies a safety condition that the vehicle will collide with none of objects around the vehicle. The process further includes setting a completion condition indicating a position or time at which the completion of the lane change is required, based on the time elapsed since the instruction by the driver, the structure of a road being traveled by the vehicle, or the situation of the road; determining whether the completion condition is satisfied when the vehicle is driven according to the driving plan; controlling the vehicle to make the lane change according to the driving plan when the completion condition is satisfied; and restricting execution of the lane change when the completion condition is not satisfied.

The vehicle controller according to the present disclosure has an advantageous effect of being able to prevent a driver from feeling the behavior of his/her vehicle strange when the vehicle makes a lane change automatically.

DESCRIPTION OF EMBODIMENTS

A vehicle controller, a method for vehicle control and a computer program for vehicle control executed by the vehicle controller will now be described with reference to the attached drawings. The vehicle controller causes a vehicle to make a lane change as necessary during autonomous driving control of the vehicle.

Before a lane change, a driver of a vehicle is notified of the execution of the lane change so as not to make the driver anxious. In some cases, the driver is requested to watch the situation around the vehicle, including the situation on a destination lane, in addition to being notified of the lane change. However, depending on the situation around the vehicle, it may be difficult to complete the lane change before reaching the location or by the time at which completion of the lane change is required, after the notification of the lane change and the transition to a sequence to make a lane change. If the lane change is actually canceled when the vehicle reaches the limit location where the lane change is determined to be impossible, the driver will be kept requested to watch the surroundings until the cancelation although the lane change will not be made. If control of the vehicle is handed over to the driver when the lane change is determined to be impossible, the driver may not have enough time. Conversely, if a vehicle controller makes a prior notification of a lane change with sufficient time or distance, the lane change will be made at unnatural timing, which may give the driver a strange feeling. Additionally, this will excessively limit the situation in which a lane change can be made automatically, and decrease convenience.

Thus the vehicle controller sets a completion condition indicating a position or time at which completion of a lane change is required. The vehicle controller further determines whether the completion condition is satisfied when the vehicle is driven according to a driving plan for controlling the lane change. The driving plan represents travel behavior of the vehicle until completion of the lane change. When the completion condition is satisfied, the vehicle controller controls the vehicle to make the lane change according to the driving plan for controlling the lane change; when the completion condition is not satisfied, the vehicle controller restricts execution of the lane change.

Figure 1:
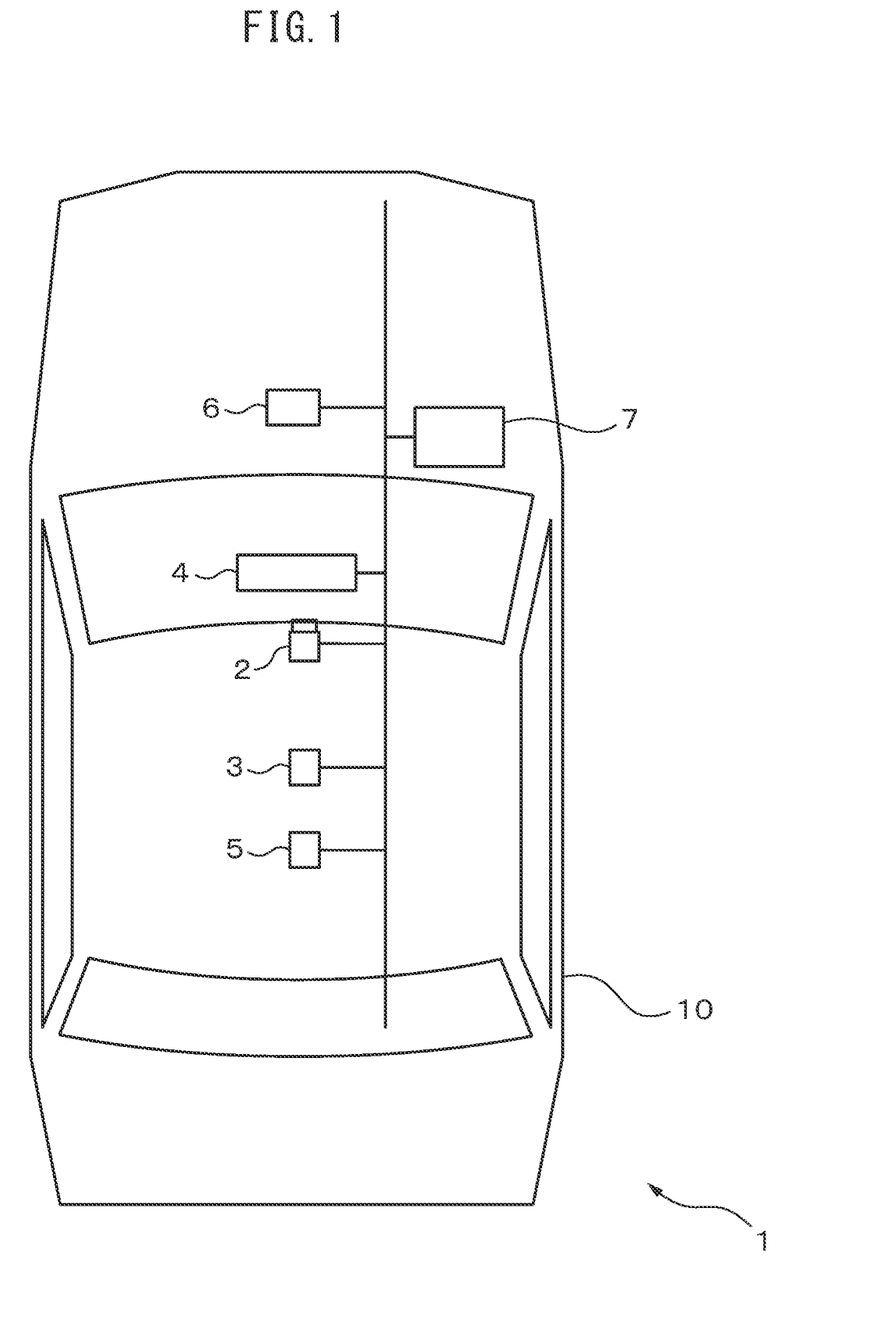
FIG. 1 schematically illustrates the configuration of a vehicle control system equipped with a vehicle controller.
Figure 2:
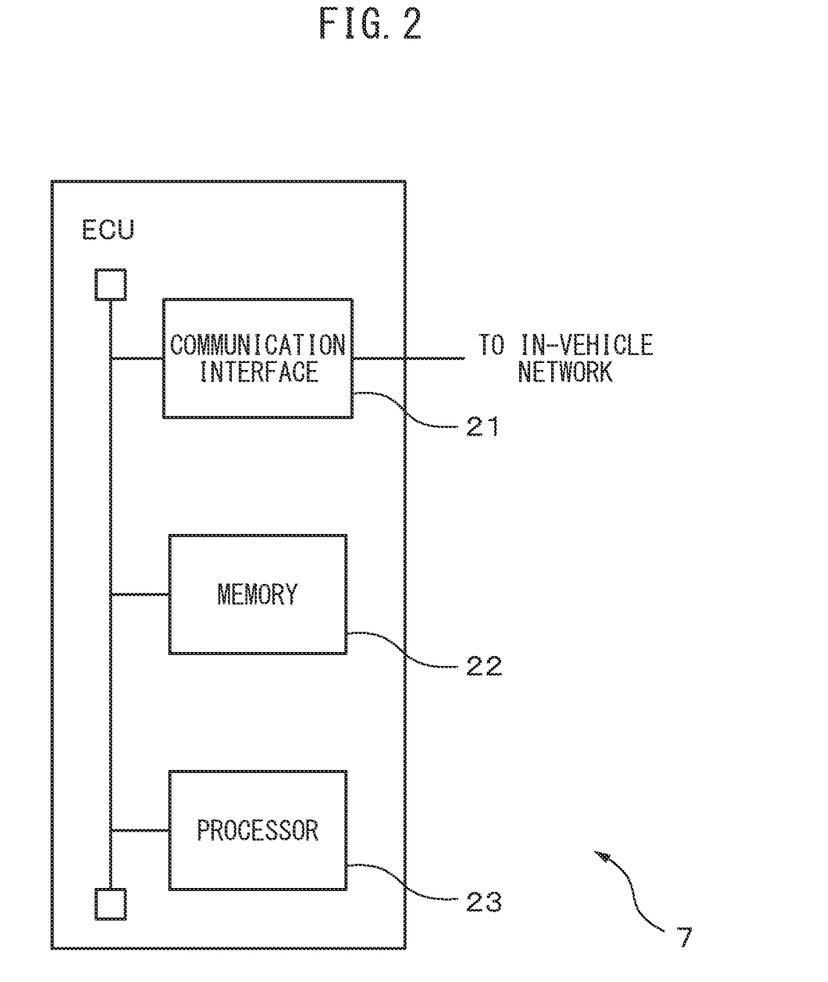
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a camera 2, a GPS receiver 3, a navigation device 4, a wireless communication device 5, a storage device 6, and an electronic control unit (ECU) 7, which is an example of the vehicle controller. The camera 2, the GPS receiver 3, the navigation device 4, the wireless communication device 5, and the storage device 6 are connected to the ECU 7 via an in-vehicle network conforming to a standard, such as a controller area network, so that they can communicate with each other. The vehicle control system 1 may further include a range sensor (not illustrated), such as LiDAR or radar, which measures the distances from the vehicle 10 to objects around the vehicle 10.

The camera 2, which is an example of a sensor that generates a sensor signal representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 captures a region in front of the vehicle 10 every predetermined capturing period (e.g., 1/30 to 1/10 seconds), and generates images representing the region. Each image obtained by the camera 2 is an example of the sensor signal. The vehicle 10 may include multiple cameras taking pictures in different orientations or having different focal lengths.

Whenever generating an image, the camera 2 outputs the generated image to the ECU 7 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the navigation device 4 and the ECU 7 via the in-vehicle network at predetermined intervals. Instead of the GPS receiver, the vehicle 10 may include a receiver that receives positioning signals from satellites of another satellite positioning system to determine the position of the vehicle 10.

The navigation device 4 executes a navigation process on the vehicle 10 in accordance with a navigation program executed by the device. For example, when the driver starts the navigation program and inputs the destination of the vehicle 10, the navigation device 4 searches for a travel route of the vehicle 10 from the current position of the vehicle 10 to the destination. To this end, the navigation device 4 refers to a map for route search stored therein and representing individual road sections and the connection relationship therebetween to search for a travel route in accordance with a predetermined route searching technique, such as Dijkstra's algorithm. The travel route includes information indicating, for example, a road that the vehicle will travel before reaching the destination, a travel direction at a divergent point on the travel route, and the position of an intersection at which the vehicle will turn right or left. The navigation device 4 can use, for example, the position of the vehicle 10 based on the latest result of determination received from the GPS receiver 3 as the current position of the vehicle 10.

Upon determining a travel route of the vehicle 10, the navigation device 4 outputs information indicating the travel route to the ECU 7 via the in-vehicle network.

The wireless communication device 5 communicates with a wireless base station by wireless in conformity with a predetermined standard of mobile communications. The wireless communication device 5 receives traffic information or construction information indicating the state of traffic or construction of the road being traveled by the vehicle 10 or an area therearound (e.g., information provided by the Vehicle Information and Communication System) from another device via the wireless base station. The wireless communication device 5 outputs the received traffic information to the ECU 7 via the in-vehicle network. The wireless communication device 5 may receive a high-precision map of a predetermined region around the current position of the vehicle 10 used for autonomous driving control from a map server via the wireless base station, and output the received high-precision map to the storage device 6.

The storage device 6, which is an example of a storage unit, includes, for example, a hard disk drive, a nonvolatile semiconductor memory, or an optical medium and an access device therefor. The storage device 6 stores a high-precision map, which is an example of a map including information on lanes of roads. The high-precision map includes, for example, information indicating the number of lanes, road markings such as lane-dividing lines or stop lines, and signposts for each road included in a predetermined region represented in the map.

The storage device 6 may further include a processor for executing, for example, a process to update the high-precision map and a process related to a request from the ECU 7 to read out the high-precision map. For example, whenever the vehicle 10 moves a predetermined distance, the storage device 6 may transmit the current position of the vehicle 10 and a request to obtain a high-precision map to the map server via the wireless communication device 5, and receive a high-precision map of a predetermined region around the current position of the vehicle 10 from the map server via the wireless communication device 5. When receiving a request from the ECU 7 to read out the high-precision map, the storage device 6 cuts out that portion of the high-precision map stored therein which includes the current position of the vehicle 10 and which represents a region smaller than the predetermined region, and outputs the cut portion to the ECU 7 via the in-vehicle network.

The ECU 7 executes autonomous driving control of the vehicle 10. When making a lane change automatically, the ECU 7 of the present embodiment makes a driving plan representing travel behavior of the vehicle until completion of the lane change and satisfying a safety condition that the vehicle 10 will collide with none of objects around the vehicle. The ECU 7 further sets a completion condition indicating a position or time at which the completion of the lane change is required. The ECU 7 then determines whether the completion condition is satisfied when the vehicle 10 is driven according to the driving plan, and determines whether to make the lane change actually, based on the result of determination.

As illustrated in FIG. 2, the ECU 7 includes a communication interface 21, a memory 22, and a processor 23. The communication interface 21, the memory 22, and the processor 23 may be separate circuits or a single integrated circuit.

The communication interface 21 includes an interface circuit for connecting the ECU 7 to the in-vehicle network. Whenever receiving an image from the camera 2, the communication interface 21 passes the received image to the processor 23. Whenever receiving positioning information from the GPS receiver 3, the communication interface 21 passes the positioning information to the processor 23. When receiving a travel route from the navigation device 4, the communication interface 21 passes the travel route to the processor 23. Additionally, when receiving, for example, traffic information via the wireless communication device 5 from another device, the communication interface 21 passes the information to the processor 23. Additionally, the communication interface 21 passes the high-precision map read from the storage device 6 to the processor 23.

The memory 22, which is another example of a storage unit, includes, for example, volatile and nonvolatile semiconductor memories, and stores various types of data used in a vehicle control process executed by the processor 23. For example, the memory 22 stores parameters of the camera 2, such as its focal length, direction of image capturing, and mounted position, and various parameters for defining a classifier used for detecting objects around the vehicle 10. The memory 22 further stores a travel route, positioning information of the vehicle 10, images of the surroundings of the vehicle 10, and a high-precision map. Additionally, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 3:
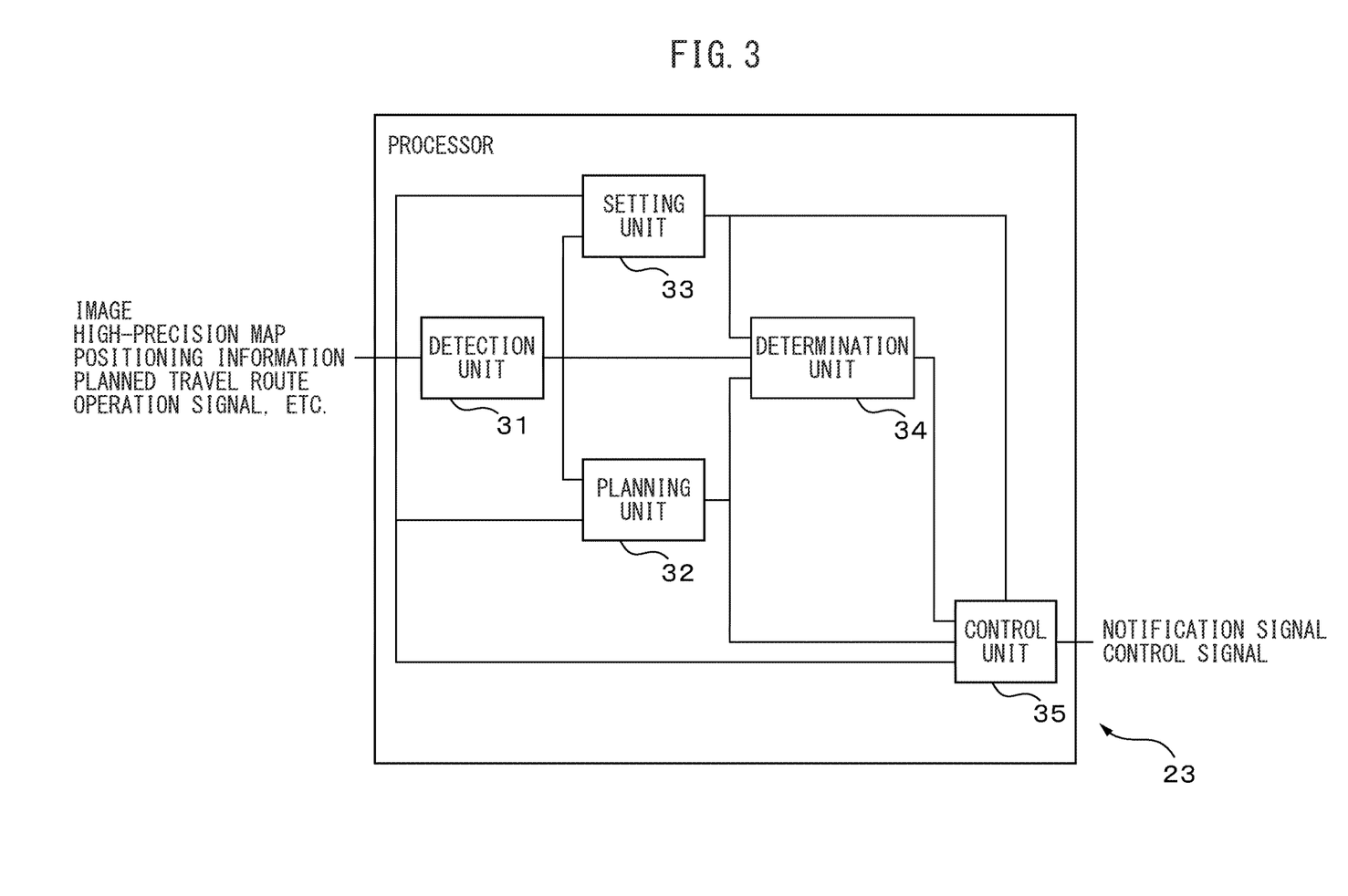
FIG. 3 is a functional block diagram of a processor of the electronic control unit, related to a vehicle control process.

FIG. 3 is a functional block diagram of the processor 23 related to the vehicle control process. The processor 23 includes a detection unit 31, a planning unit 32, a setting unit 33, a determination unit 34, and a control unit 35. These units included in the processor 23 are functional modules, for example, implemented by a computer program executed by the processor 23, or may be dedicated operating circuits provided in the processor 23.

Whenever the ECU 7 receives an image representing the surroundings of the vehicle 10 (hereafter simply an "image") from the camera 2, the detection unit 31 detects objects around the vehicle 10 which may affect travel of the vehicle 10 (hereafter simply "objects") from the image. For example, the detection unit 31 inputs the image into a classifier to detect detection target objects represented in the image. As such a classifier, the detection unit 31 may use, for example, a deep neural network (DNN) having a convolutional neural network (CNN) architecture, e.g., Single Shot MultiBox Detector (SSD) or Faster R-CNN. Such a classifier is trained in advance to detect a detection target object from an image. The classifier outputs information for identifying an object region including an object detected in the inputted image and information indicating the type of the detected object. Examples of the detection target objects that may affect travel of the vehicle 10 include moving objects, such as pedestrians or traveling vehicles around the vehicle 10, or features on or around roads, such as road markings including lane-dividing lines, signposts, or curbstones.

In the case that the vehicle 10 is equipped with a range sensor (not illustrated), the detection unit 31 may detect objects around the vehicle 10, based on ranging signals obtained by the range sensor and indicating the distances to objects located in respective directions around the vehicle 10. In this case also, the detection unit 31 can detect the objects around the vehicle 10 by inputting the ranging signals into a classifier that has been trained to detect detection target objects. Each ranging signal is another example of a sensor signal representing the surroundings of the vehicle 10; the range sensor is another example of a sensor that generates a sensor signal.

Additionally, the detection unit 31 compares the image with the high-precision map to detect a host vehicle lane being traveled by the vehicle 10. For example, with an assumption about the position and orientation of the vehicle 10, the detection unit 31 projects features on or near the road detected from the image onto the high-precision map, or features on or near the road around the vehicle 10 represented in the high-precision map onto the image. The detection unit 31 then estimates the position of the vehicle 10 to be the position and orientation of the vehicle 10 for the case that the features detected from the image match those represented in the high-precision map the best. The detection unit 31 then refers to the high-precision map to identify the lane including the position of the vehicle 10 as the host vehicle lane being traveled by the vehicle 10.

The detection unit 31 uses initial values of the assumed position and orientation of the vehicle 10 and parameters of the camera 2, such as its focal length, height of the mounted position, and direction of image capturing, to determine the positions in the high-precision map or the image to which the features are projected. As the initial values of the position and orientation of the vehicle 10 is used the position of the vehicle 10 measured by the GPS receiver 3 or obtained by correcting, with odometry information, the position and orientation of the vehicle 10 estimated at the last detection of the host vehicle lane. The detection unit 31 then calculates the degree of matching (e.g., a normalized cross-correlation value) between the features on or near the road detected from the image and those represented in the high-precision map.

The detection unit 31 repeats the above-described process while varying the assumed position and orientation of the vehicle 10. The detection unit 31 then estimates the actual position of the vehicle 10 to be the position and orientation for the case that the degree of matching is a maximum.

The detection unit 31 notifies information indicating the detected objects and the host vehicle lane to the planning unit 32, the setting unit 33, the determination unit 34, and the control unit 35.

The planning unit 32 makes a driving plan related to a lane change from the host vehicle lane being traveled by the vehicle to another lane when an instruction by the driver of the vehicle 10, a travel situation of the vehicle 10, or a road structure around the vehicle 10 causes a request for the lane change. The driving plan for controlling the lane change of the vehicle 10 represents travel behavior of the vehicle 10 until completion of the lane change, and is made so as to satisfy a safety condition that the vehicle 10 will collide with none of objects around the vehicle 10.

The instruction by the driver as an example of a trigger for making a driving plan is given by, for example, an operation of a direction indicator or the driver's voice collected with a microphone (not illustrated) provided in the interior of the vehicle. When the instruction is given by an operation of a direction indicator, the planning unit 32 makes a driving plan to make a lane change to a target lane on the side designated by the operation, of the left and right lanes adjoining the host vehicle lane. When the instruction is given by the driver's voice, the planning unit 32 recognizes the driver's instruction represented by a collected voice signal in accordance with a predetermined voice recognition algorithm and makes a driving plan to make a lane change to a target lane on the side indicated by the recognized instruction.

The travel situation of the vehicle 10 as another example of a trigger for making a driving plan may be, for example, the situation in which the host vehicle lane differs from a lane tending toward the destination of the vehicle 10, the vehicle 10 passes a leading vehicle, or the vehicle 10 returns from a passing lane to a travel lane. The situation in which there is an obstacle on the host vehicle lane ahead of the vehicle 10 may also be included in the travel situation of the vehicle 10 as another example of a trigger for making a driving plan.

The planning unit 32 refers to the travel route, the current position of the vehicle 10, and the high-precision map to determine whether a section from the current position of the vehicle 10 to a predetermined distance away includes a divergent point where a lane tending toward the destination diverges from the road being traveled by the vehicle 10. When there is such a divergent point, the planning unit 32 determines whether the host vehicle lane differs from the lane tending toward the destination. When the host vehicle lane differs from it, the planning unit 32 makes a driving plan to make one or more lane changes to the lane tending toward the destination as a target lane.

Additionally, in the case that the speed of the vehicle 10 is not greater than a predetermined speed threshold and that the distance between the vehicle 10 and a leading vehicle traveling ahead of the vehicle 10 has not been greater than a predetermined distance for a predetermined period, the planning unit 32 makes a driving plan to make a lane change to pass the leading vehicle. The predetermined period may be, for example, several seconds to several tens of seconds. In this case, the planning unit 32 preferably sets a passing lane, of the lanes adjoining the host vehicle lane, as a target lane. Of the vehicles detected from the image, the planning unit 32 identifies a vehicle located in a region in the image corresponding to an area ahead of the vehicle 10 as a leading vehicle. The predetermined speed threshold is set, for example, at a speed obtained by subtracting a predetermined offset value (e.g., 10 km/h to 20 km/h) from the legally permitted speed or the regulation speed of the road being traveled by the vehicle 10. Thus the planning unit 32 refers to the current position of the vehicle 10 and the high-precision map to identify the legally permitted speed or the regulation speed of the road being traveled by the vehicle 10, thereby setting the speed threshold. The planning unit 32 can estimate the distance between the leading vehicle and the vehicle 10, based on the horizontal width of the object region including the leading vehicle and the number of reference pixels in an image corresponding to a reference vehicle width of the type of the leading vehicle represented in the image for the case that the distance between the vehicles is a reference distance. The reference distance and the number of reference pixels for each type of vehicle may be prestored in the memory 22. The type of the leading vehicle is estimated to be that detected by the detection unit 31. Alternatively, the planning unit 32 may estimate the distance between the leading vehicle and the vehicle 10, based on the bottom position of the object region including the leading vehicle. The bottom position of the object region including the leading vehicle is assumed to correspond to the position where the leading vehicle is in contact with the road surface. Additionally, the positions of pixels in the image correspond one-to-one to the directions viewed from the camera 2. Thus the planning unit 32 can estimate the distance from the camera 2 to the leading vehicle by referring to the bottom position of the object region in the image and parameters of the camera 2, such as the height of the mounted position and the imaging direction, and uses the distance as the distance between the leading vehicle and the vehicle 10. Alternatively, in the case that the vehicle 10 is equipped with a range sensor (not illustrated), the planning unit 32 may use the distance to an object ahead of the vehicle 10 measured by the range sensor as the distance between the leading vehicle and the vehicle 10.

Additionally, in the case that the host vehicle lane is a passing lane and that the vehicle 10 has been traveling on the passing lane for a preceding predetermined period, the planning unit 32 makes a driving plan to make a lane change to return the vehicle 10 to a travel lane. The planning unit 32 may refer to the high-precision map to determine whether the host vehicle lane is a passing lane. In this case, the planning unit 32 determines one of travel lanes in the road being traveled by the vehicle 10 as a target lane.

Further, when a three-dimensional stationary object is detected by the detection unit 31 on the host vehicle lane ahead of the vehicle 10, the planning unit 32 determines that the current travel situation is the situation in which there is an obstacle on the host vehicle lane ahead of the vehicle 10. Additionally, when traffic information received via the wireless communication device 5 indicates that travel on the host vehicle lane is restricted ahead of the vehicle 10, the planning unit 32 also determines that the current travel situation is the situation in which there is an obstacle on the host vehicle lane ahead of the vehicle 10. When the current travel situation is the situation in which there is an obstacle on the host vehicle lane ahead of the vehicle 10, the planning unit 32 makes a driving plan to make a lane change to an adjoining lane as a target lane.

The road structure around the vehicle 10 as another example of a trigger for making a driving plan may be, for example, a structure ahead of the vehicle 10 where the number of lanes is reduced or a tollgate exists. The planning unit 32 refers to the high-precision map to determine whether a section from the current position of the vehicle 10 to a predetermined distance away includes such a structure. When there is such a structure, the planning unit 32 makes a driving plan to make a lane change to a lane remaining after the reduction in the number of lanes or a particular lane as a target lane.

When making a driving plan, the planning unit 32 generates one or more planned trajectories of the vehicle 10 in a section from the current position of the vehicle 10 to the position where the lane change to the target lane will be completed. Each planned trajectory is represented, for example, as a set of target positions of the vehicle 10 at respective times during travel of the vehicle 10 through the predetermined section.

In the present embodiment, the planning unit 32 generates a planned trajectory so that one or more lane changes to the target lane depending on the type of the trigger will be made. Specifically, the planning unit 32 generates a planned trajectory satisfying a safety condition that the vehicle 10 will not collide with any of objects around the vehicle 10, in particular, any of other vehicles traveling on the host vehicle lane or the adjoining lane on the side of the target lane. For example, the safety condition may be that predicted distances between the vehicle 10 and objects around the vehicle 10 will not be less than a predetermined distance until completion of the lane change. Thus the planning unit 32 tracks the objects detected from time-series images obtained by the camera 2, and estimates predicted trajectories of the respective objects to a predetermined time ahead from the trajectories obtained from the result of tracking. To this end, the planning unit 32 applies a tracking process based on optical flow, such as the Lucas-Kanade method, to an object region representing an object of interest in the latest image and object regions in past images obtained by the camera 2, thereby tracking the object represented in the object regions. To achieve this, the planning unit 32 applies, for example, a filter for extracting characteristic points, such as SIFT or Harris operator, to the object region of interest, thereby extracting characteristic points from the object region. The planning unit 32 then identifies those points in the object regions in the past images which correspond to the characteristic points in accordance with the applied tracking technique, thereby calculating the optical flow. Alternatively, the planning unit 32 may apply another tracking technique applied for tracking a moving object detected from an image to the object region of interest in the latest image and the object regions in the past images, thereby tracking the object represented in the object regions.

For each object being tracked, the planning unit 32 executes viewpoint transformation, using information such as the position at which the camera 2 is mounted on the vehicle 10, thereby transforming the image coordinates of the object into coordinates in an aerial image ("aerial-image coordinates"). To this end, the planning unit 32 can estimate the position of the detected object at the time of acquisition of each image, using the position and orientation of the vehicle 10, an estimated distance to the detected object, and the direction from the vehicle 10 to the object at the time of acquisition of each image. For each object being tracked, the planning unit 32 can estimate the trajectory of the object by arranging the estimated positions in chronological order. The planning unit 32 can estimate the predicted trajectories of the objects being tracked to a predetermined time ahead by executing a prediction process with, for example, a Kalman filter or a particle filter, based on the trajectories of the objects in a preceding predetermined period.

The planning unit 32 generates a planned trajectory, based on the predicted trajectories of the objects being tracked, so that a predicted distance between the vehicle 10 and each object will not be less than a predetermined distance until the predetermined time ahead and that the lane change to the target lane will be completed. In particular, the planning unit 32 generates a planned trajectory so that the distances between the vehicle 10 and vehicles traveling ahead of and behind the vehicle 10 on the destination lane will not be less than the predetermined distance. To this end, the planning unit 32 generates a planned trajectory in accordance with a predetermined optimization algorithm, such as simulated annealing or the steepest-descent method, so that the behavior of the vehicle 10 will satisfy its restriction conditions (e.g., conditions of the tolerable ranges of acceleration/deceleration and the amount of changes in the steering angle). The planning unit 32 uses the generated planned trajectory as a driving plan.

When there are multiple planned trajectories satisfying the safety condition and enabling the lane change to the target lane, the planning unit 32 may select one of the planned trajectories such that the lane change to the target lane will be completed in the shortest distance or time. The planning unit 32 uses the selected planned trajectory as a driving plan.

The planning unit 32 outputs the planned trajectory generated as a driving plan to the determination unit 34 and the control unit 35.

The setting unit 33 sets a completion condition indicating a position or time at which the completion of the lane change to the target lane is required, based on the time elapsed since the driver's instruction, the structure of the road being traveled by the vehicle 10, or the situation of the road. A position at which the completion of the lane change to the target lane is required will hereafter be referred to as a "target completion position." Similarly, a time at which the completion of the lane change to the target lane is required will hereafter be referred to as a "target completion time."

For example, when the trigger for making a driving plan is the driver's instruction of a lane change, the setting unit 33 sets the allowable upper limit of the time elapsed since the driver's instruction of the lane change, as a target completion time. The allowable upper limit may be pre-stored in the memory 22. When the trigger for making a driving plan is for the vehicle 10 to pass a leading vehicle or to return from a passing lane to a travel lane, the setting unit 33 also sets the allowable upper limit of the time elapsed since the determination that the situation is one of the above, as a target completion time.

When the trigger for making a driving plan is that the lane tending toward the destination diverges, the setting unit 33 sets the limit position to enter the lane tending toward the destination (e.g., a lane diverging from a main road) as a target completion position. In this case, the setting unit 33 refers to the high-precision map to identify the location where the lane tending toward the destination diverges, and determines the position closer to the vehicle 10 by a predetermined distance than the identified divergent location as a target completion position.

However, when the lane tending toward the destination is jammed with traffic, the setting unit 33 may set the endpoint of the jam as a target completion position. In this case, the setting unit 33 sets the endpoint of the jam indicated by traffic information received via the wireless communication device 5 as a target completion position. Alternatively, the setting unit 33 may detect the endpoint of the jam, based on an image generated by the camera 2. For example, of the vehicles detected by the detection unit 31 on a lane from which the lane tending toward the destination diverges, the setting unit 33 identifies the vehicle ahead of and closet to the vehicle 10. The setting unit 33 can identify the vehicles on the lane from which the lane tending toward the destination diverges, by comparing individual lane-dividing lines detected from the image with the positions of the vehicles. The setting unit 33 estimates the speed of the identified vehicle, based on the result of tracking of the vehicle by the planning unit 32. When the estimated speed of the vehicle is not greater than a jam determination speed, the setting unit 33 determines that the lane tending toward the destination is jammed with traffic, and sets the position closer to the vehicle 10 by a predetermined offset distance than the rear end of the identified vehicle, which is determined to be the endpoint of the jam, as a target completion position.

When the trigger for making a driving plan is that the road structure around the vehicle 10 is a particular structure requiring a lane change, the setting unit 33 sets a location beyond which a lane change cannot be made because of the road structure or the position closer to the vehicle 10 by a predetermined offset distance than the location as a target completion position. The location beyond which a lane change cannot be made because of the road structure is, for example, the start point of a lane-change prohibited section, a location where lanes separate into different roads, the start point of a curve having a radius of curvature less than a predetermined value, or a location in front of a tollgate where there are no lanes or a lane change is regulated.

When the trigger for making a driving plan is that there is an obstacle on the host vehicle lane, the setting unit 33 sets the position closer to the vehicle 10 by a predetermined offset distance than that of the obstacle as a target completion position.

Figure 4A:
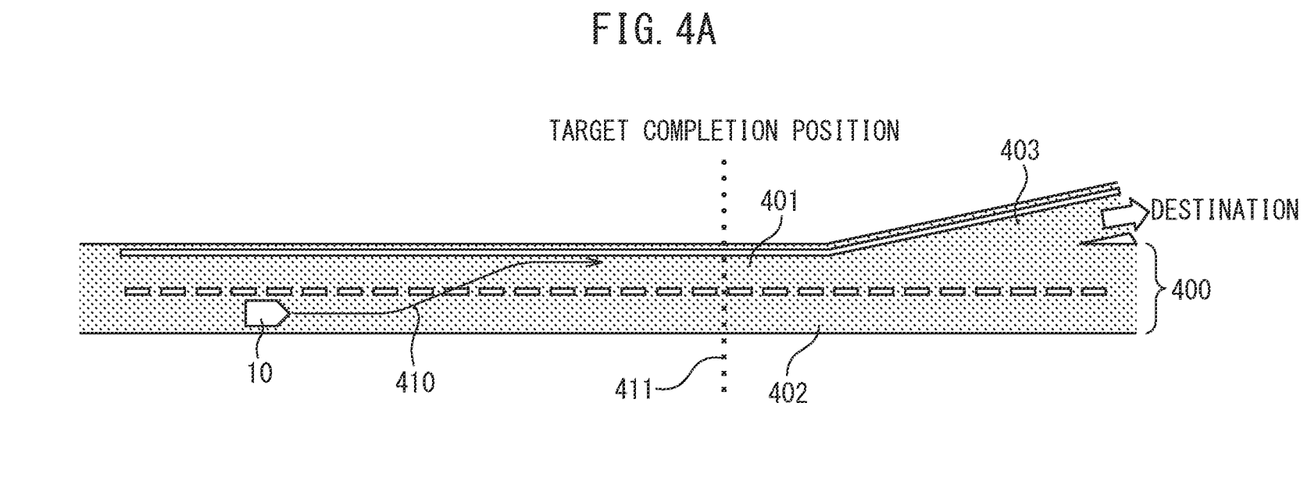
FIG. 4A illustrates an example of the completion condition.
Figure 4B:
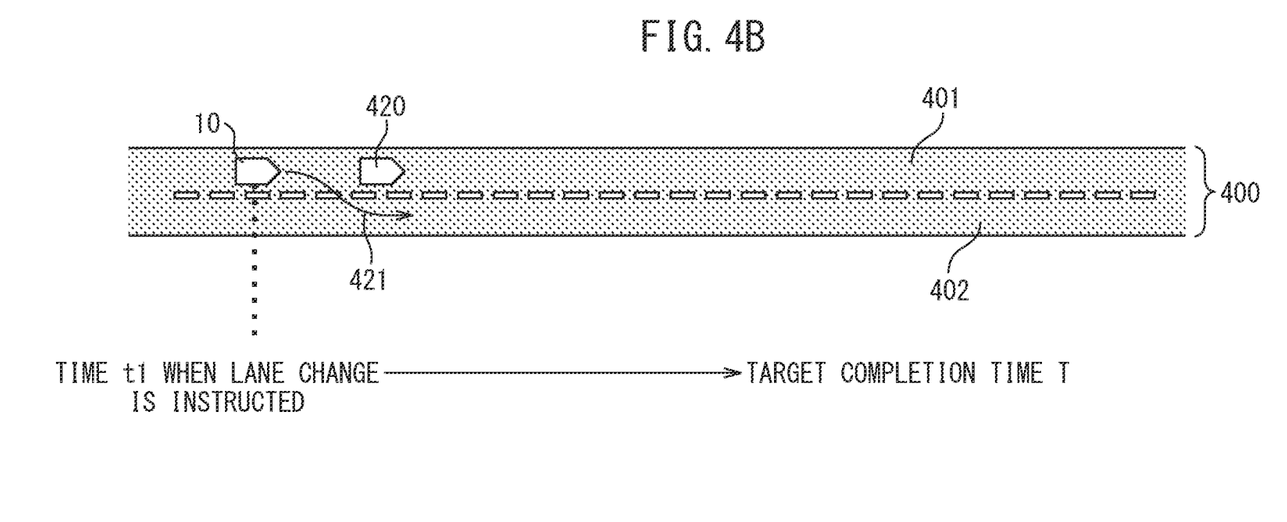
FIG. 4B illustrates another example of the completion condition.

FIGS. 4A and 4B illustrate examples of the completion condition. In the example illustrated in FIG. 4A, a road 400 being traveled by the vehicle 10 has two lanes 401 and 402, and of these, the vehicle 10 is traveling on the right lane 402. The left lane 401 has a diverging route 403. The destination of the vehicle 10 is located beyond the diverging route 403. Hence, a planned trajectory 410 to make a lane change from the lane 402 to the lane 401 is made as a driving plan. Thus, a target completion position 411 that is the limit position to enter the diverging route 403 is set as a completion condition.

In the example illustrated in FIG. 4B also, a road 400 being traveled by the vehicle 10 has two lanes 401 and 402. The vehicle 10 is traveling on the left lane 401. In this example, to pass a leading vehicle 420 traveling ahead of the vehicle 10, the driver's operation gives an instruction to make a lane change 421 to the right lane 402. Thus, a target completion time T that is the allowable upper limit of the time elapsed since time t1 when the instruction of the lane change is given is set as a completion condition.

As described above, when the driver's instruction causes the request for the lane change, the setting unit 33 sets the completion condition, based on the time elapsed since the instruction. When the travel situation of the vehicle or the road structure around the vehicle 10 causes the request for the lane change, the setting unit 33 sets the completion condition, based on the position at which the completion of the lane change is required. In this way, the setting unit 33 can set the completion condition appropriately, depending on the event of the trigger for making the lane change.

The setting unit 33 notifies the determination unit 34 and the control unit 35 of the set completion condition (i.e., the target completion time or position).

The determination unit 34 determines whether the completion condition is satisfied when the vehicle 10 is driven according to the driving plan. More specifically, in the case that the vehicle 10 driven along the planned trajectory, which is the driving plan, will complete the lane change to the target lane by the target completion time or before reaching the target completion position, the determination unit 34 determines that the completion condition is satisfied. More specifically, when a target completion time is set as the completion condition, the determination unit 34 compares the target completion time with the expected time included in the planned trajectory at which the vehicle 10 will complete the lane change to the target lane. When the expected time at which the vehicle 10 will complete the lane change to the target lane is equal to or earlier than the target completion time, the determination unit 34 determines that the completion condition is satisfied. In contrast, when the expected time at which the vehicle 10 will complete the lane change to the target lane is later than the target completion time, the determination unit 34 determines that the completion condition is not satisfied. When a target completion position is set as the completion condition, the determination unit 34 compares the target completion position with the expected position included in the planned trajectory at which the vehicle 10 will complete the lane change to the target lane. When the expected position at which the vehicle 10 will complete the lane change to the target lane is equal to the target completion position or closer to the current position of the vehicle 10 than the target completion position, the determination unit 34 determines that the completion condition is satisfied. In contrast, when the expected position at which the vehicle 10 will complete the lane change to the target lane is farther from the current position of the vehicle 10 than the target completion position, the determination unit 34 determines that the completion condition is not satisfied.

Figure 5:
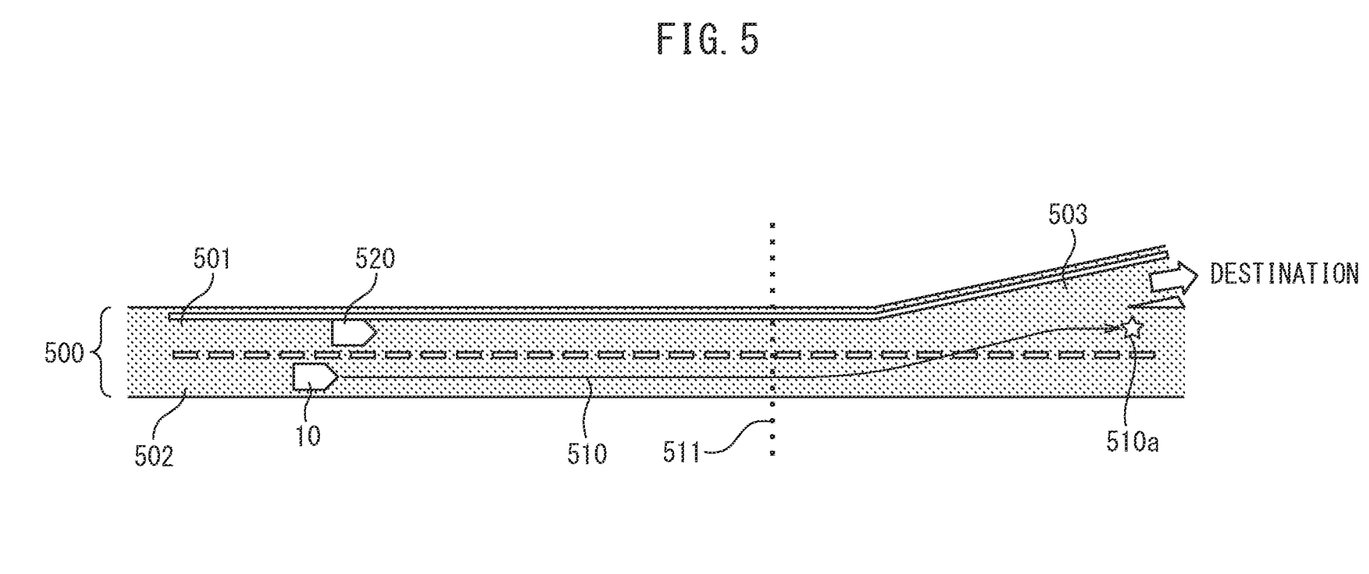
FIG. 5 illustrates an example of the travel situation of a vehicle for the case that the completion condition is not satisfied.

FIG. 5 illustrates an example of the travel situation of the vehicle 10 for the case that the completion condition is not satisfied. In the example illustrated in FIG. 5, a road 500 being traveled by the vehicle 10 has two lanes 501 and 502, and of these, the vehicle 10 is traveling on the right lane 502. The left lane 501 has a diverging route 503. The destination of the vehicle 10 is located beyond the diverging route 503. Hence, a planned trajectory 510 to make a lane change from the lane 502 to the lane 501 is made as a driving plan. The limit position to enter the diverging route 503 is set as a target completion position 511. In this example, since another vehicle 520 is traveling ahead of the vehicle 10 on the left, the position 510a at which the lane change along the planned trajectory 510 will be completed is beyond the target completion position 511 as viewed from the current position of the vehicle 10. Hence, the lane change will not be completed before the vehicle 10 reaches the target completion position 511. Thus, it is determined that the completion condition is not satisfied.

Figure 6:
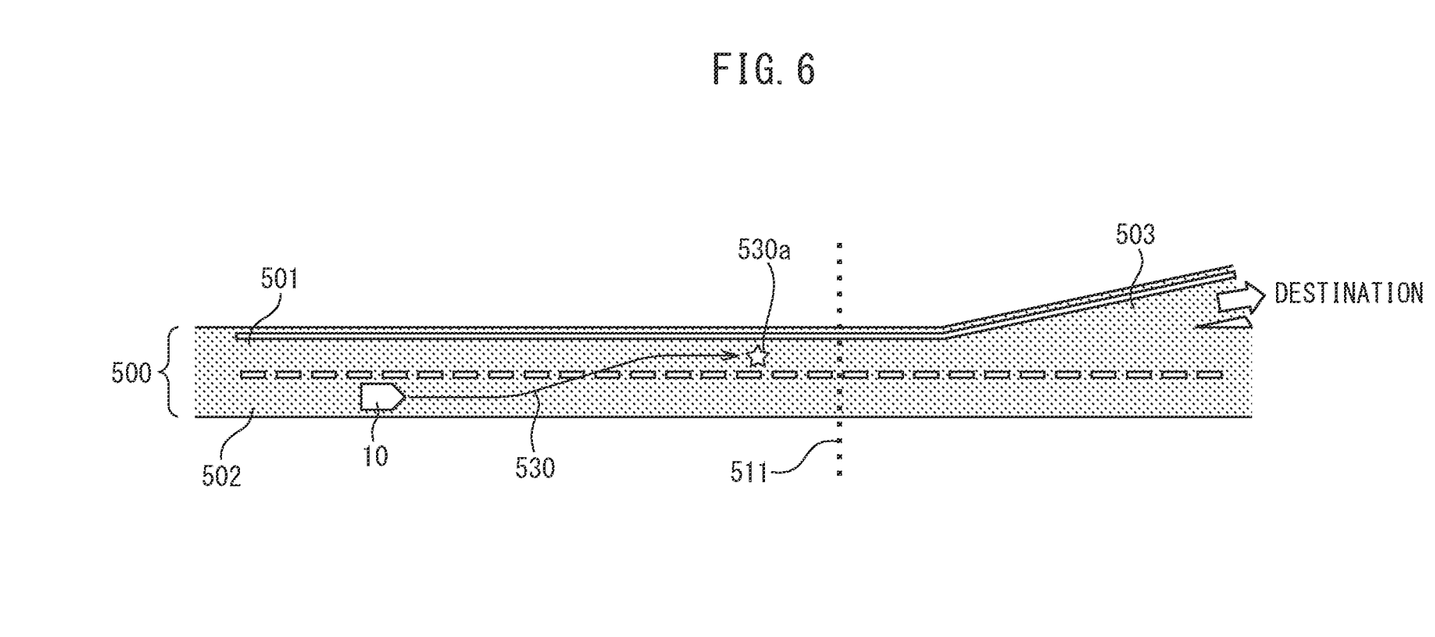
FIG. 6 illustrates an example of the travel situation of a vehicle for the case that the completion condition is satisfied.

FIG. 6 illustrates an example of the travel situation of the vehicle 10 for the case that the completion condition is satisfied. In the example illustrated in FIG. 6 also, a road 500 being traveled by the vehicle 10 has two lanes 501 and 502, and of these, the vehicle 10 is traveling on the right lane 502, as in the example illustrated in FIG. 5. The left lane 501 has a diverging route 503. The destination of the vehicle 10 is located beyond the diverging route 503. Hence, a planned trajectory 530 to make a lane change from the lane 502 to the lane 501 is made as a driving plan. The limit position to enter the diverging route 503 is set as a target completion position 511. In this example, since there is no vehicle traveling on the left lane 501 near the vehicle 10, the position 530a at which the lane change along the planned trajectory 530 will be completed is closer to the current position of the vehicle 10 than the target completion position 511. Hence, the lane change is to be completed before the vehicle 10 reaches the target completion position 511. Thus, it is determined that the completion condition is satisfied.

The determination unit 34 notifies the control unit 35 of the result of determination whether the completion condition is satisfied.

The control unit 35 refers to the result of determination whether the completion condition is satisfied to determine whether to make the lane change according to the driving plan. In the present embodiment, when the completion condition is satisfied, the control unit 35 controls the vehicle 10 to make the lane change according to the driving plan. In contrast, when the completion condition is not satisfied, the control unit 35 restricts execution of the lane change.

When making a lane change, the control unit 35 controls components of the vehicle 10 so that the vehicle 10 will travel along the planned trajectory, which is made by the planning unit 32 as the driving plan, to make the lane change to the target lane. For example, the control unit 35 determines the acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 will be equal to the determined acceleration. The control unit 35 then determines the amount of fuel injection according to the set degree of accelerator opening, and outputs a control signal depending on the amount of fuel injection to a fuel injector of an engine of the vehicle 10. Alternatively, the control unit 35 determines the electric power to be supplied to a motor according to the set degree of accelerator opening, and controls a driving circuit of the motor so that the determined electric power will be supplied to the motor. Additionally, the control unit 35 outputs a control signal depending on the set amount of braking to the brake of the vehicle 10. When changing the direction of the vehicle 10 in order for the vehicle 10 to travel along the planned trajectory, the control unit 35 determines the steering angle of the vehicle 10 according to the planned trajectory. The control unit 35 then outputs a control signal depending on the steering angle to an actuator (not illustrated) that controls the steering wheel of the vehicle 10. Additionally, while making a lane change, the control unit 35 may request the driver to watch the surroundings of the vehicle 10, with a notification device (not illustrated) provided in the interior of the vehicle.

When restricting execution of the lane change, for example, the control unit 35 cancels or defers the execution of the lane change. The control unit 35 then controls the vehicle 10 so that it will continue traveling along the host vehicle lane. Alternatively, the control unit 35 may refuse to accept the driver's instruction of the lane change. In this case, the control unit 35 notifies the driver of refusal of the lane change with a notification device (not illustrated) provided in the interior of the vehicle. The notification device may be, for example, a display or light sources provided in or near an instrument panel. In this case, the control unit 35 causes a message or an icon indicating the refusal of the lane change to appear on the display, or turns on or blinks the light source corresponding to the message. Alternatively, the notification device may be a speaker or a vibrator provided in the steering wheel or the driver's seat. In this case, the control unit 35 outputs a voice signal indicating the refusal of the lane change to the speaker, or vibrates the vibrator. The notification device may include two or more of the above-mentioned devices. In this case, the control unit 35 may notify the driver of the refusal of the lane change with each or one of the two or more devices.

When restricting execution of the lane change, the control unit 35 may hand over control of the vehicle 10 from the ECU 7 to the driver. In this case, the control unit 35 notifies the driver of the switch from autonomous driving control to manual driving control with the notification device provided in the interior of the vehicle. For example, in the case that the notification device is a display or light sources, the control unit 35 causes a message or an icon indicating the switch from autonomous driving control to manual driving control to appear on the display, or turns on or blinks the light source corresponding to the message. In the case that the notification device is a speaker or a vibrator, the control unit 35 outputs a voice signal indicating the switch from autonomous driving control to manual driving control to the speaker, or vibrates the vibrator.

Alternatively, when restricting execution of the lane change, the control unit 35 may increase the degree of involvement of the driver in driving. For example, the control unit 35 may request the driver to hold the steering wheel, and then make the lane change according to the driving plan even if the lane change will not be completed by the target completion time. In this case also, the control unit 35 requests the driver to hold the steering wheel or to watch the surroundings of the vehicle 10, with the notification device provided in the interior of the vehicle, as in the handover of control to the driver.

As described above, there are multiple methods to restrict execution of the lane change, and the degrees of restriction differ from method to method. Thus the control unit 35 may determine the degree of restriction of the lane change, depending on the cause of the completion condition. Alternatively, the control unit 35 may dynamically select the degree of applied restriction, for example, depending on how much the completion condition is not satisfied.

For example, in the case that the completion condition is not satisfied at present but may be satisfied after a predetermined period, the control unit 35 may only defer the start of the lane change. For example, when the completion condition is defined by a target completion time, the distance between the vehicle 10 and another vehicle traveling on the destination lane may increase with the passage of time. In such a case, another instruction of a lane change by the driver after a certain period may result in the completion condition being satisfied. Thus, when it is notified by the setting unit 33 that the completion condition is defined by a target completion time, the control unit 35 obtains the current positional relationship between the vehicle 10 and a vehicle of interest traveling on the destination lane as well as its current speed relative to the vehicle 10 from the planning unit 32. Based on the positional relationship and the relative speed, the control unit 35 determines whether the distance between the vehicle 10 and the vehicle of interest increases with the passage of time. For example, when the vehicle of interest is faster than and ahead of the vehicle 10, the control unit 35 can determine that the distance between the vehicle 10 and the leading vehicle increases with the passage of time. In this case, since the completion condition may be satisfied after a predetermined period, the control unit 35 defers the start of the lane change without canceling execution thereof.

When the completion condition is defined by a target completion position, the distance from the current position of the vehicle 10 to the target completion position decreases with the passage of time; thus, in the case that the completion condition is not satisfied at present, it cannot be satisfied even after a predetermined period. Thus, in the case that the completion condition notified to the control unit 35 by the setting unit 33 is defined by a target completion position and that the completion condition is not satisfied, the control unit 35 immediately cancels execution of the lane change. Alternatively, the control unit 35 may hand over control to the driver or increase the degree of involvement of the driver in driving. In the case that the possibility of satisfaction of the completion condition varies with the passage of time, the control unit 35 may determine the possibility at certain intervals and change the degree of restriction of the lane change, depending on the result of determination.

The control unit 35 may change the degree of restriction, depending on the purpose of the lane change or the road structure around the vehicle 10. For example, when the lane change is made to go to the destination of the vehicle 10, or because of the reduction in the number of lanes of the road being traveled by the vehicle 10, or because of merging of the lanes, the control unit 35 hands over control to the driver. When the lane change is made to pass a leading vehicle, the control unit 35 defers the start of the lane change.

The control unit 35 can determine the degree of restriction of the lane change appropriately by referring to the cause of setting of the completion condition or the degree of satisfaction of the completion condition as described above.

Figure 7:
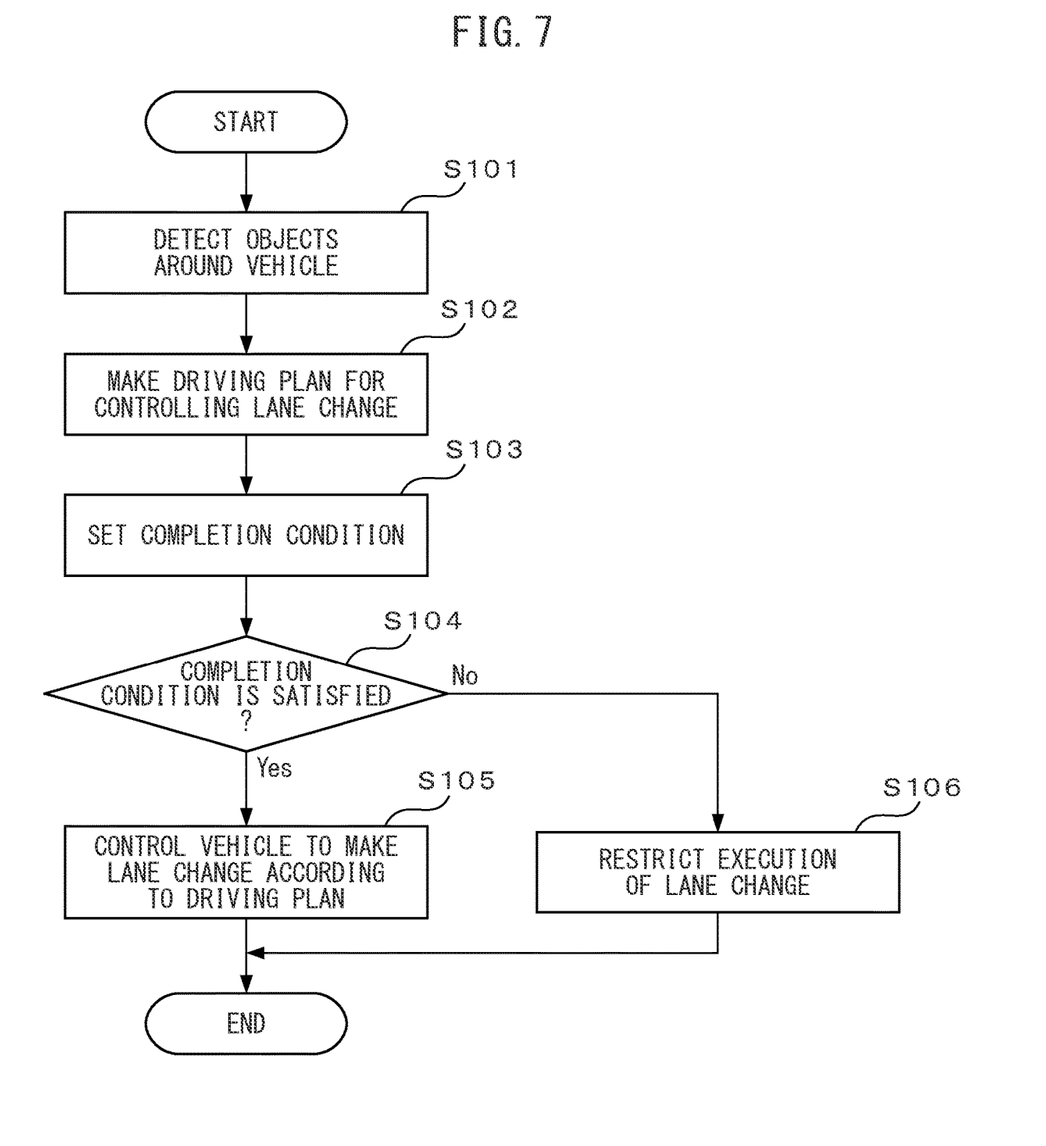
FIG. 7 is an operation flowchart of the vehicle control process.

FIG. 7 is an operation flowchart of the vehicle control process executed by the processor 23. The processor 23 executes the vehicle control process in accordance with the operation flowchart at predetermined intervals.

The detection unit 31 of the processor 23 detects objects around the vehicle 10 from an image generated by the camera 2 (step S101). The planning unit 32 of the processor 23 makes a driving plan for controlling a lane change from a host vehicle lane being traveled by the vehicle 10 to another lane when the lane change is requested (step S102). The trigger for the lane change may be an instruction by the driver of the vehicle 10, a travel situation of the vehicle 10, or a road structure around the vehicle 10. Specifically, the planning unit 32 makes a driving plan satisfying a safety condition that the vehicle 10 will collide with none of objects around the vehicle 10.

The setting unit 33 of the processor 23 sets a completion condition indicating a position or time at which the completion of the lane change to the target lane is required, based on the time elapsed since the driver's instruction, the structure of the road being traveled by the vehicle 10, or the situation of the road (step S103). The determination unit 34 of the processor 23 determines whether the completion condition is satisfied when the vehicle 10 is driven according to the driving plan (step S104).

When it is determined that the completion condition is satisfied (Yes in step S104), the control unit 35 of the processor 23 controls the vehicle 10 to make the lane change according to the driving plan (step S105). In contrast, when it is determined that the completion condition is not satisfied (No in step S104), the control unit 35 restricts execution of the lane change (step S106).

After step S105 or S106, the processor 23 terminates the vehicle control process.

As has been described above, the vehicle controller sets a completion condition indicating a position or time at which completion of a lane change is required. The vehicle controller further determines whether the completion condition is satisfied when the vehicle is driven according to a driving plan for controlling the lane change, which represents travel behavior of the vehicle until completion of the lane change. When the completion condition is satisfied, the vehicle controller controls the vehicle to make the lane change according to the driving plan for controlling the lane change; when the completion condition is not satisfied, the vehicle controller restricts execution of the lane change. Thus, the vehicle controller can prevent the driver from feeling the behavior of his/her vehicle strange when the vehicle makes a lane change automatically. Additionally, the vehicle controller can prevent imposing an unnecessary obligation to watch on the driver, and give him/her enough time even if control is handed over to the driver to make a lane change.

According to a modified example, the setting unit 33 may relax the completion condition when the driving plan satisfies a high-level safety condition than when the driving plan does not satisfy the high-level safety condition. The high-level safety condition requires a higher level of safety of the vehicle 10 than the safety condition. For example, the high-level safety condition may be that no vehicle traveling on the destination lane is detected, or that the distance between the vehicle 10 and another vehicle that has started decelerating can be kept on the destination lane longer than usual. The setting unit 33 refers to the predicted trajectories of vehicles around the vehicle 10 and the driving plan, which are obtained from the planning unit 32, to determine whether the high-level safety condition is satisfied. When the completion condition is relaxed, the setting unit 33 sets, for example, the period until the target completion time longer than usual. Alternatively, the setting unit 33 sets the target completion position farther from the vehicle 10 than usual.

Such relaxation of the completion condition in the case of the high-level safety condition being satisfied enables the vehicle controller to make restriction of a lane change less likely when the vehicle 10 can make the lane change more safely.

The computer program for achieving the functions of the processor 23 of the ECU 7 according to the embodiment or modified example may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. A vehicle controller comprising:
a processor configured to:
detect one or more objects in an area around a vehicle, based on a sensor signal obtained by a sensor mounted on the vehicle,
determine a driving plan for controlling a lane change from a host vehicle lane currently being traveled in by the vehicle to another lane when a request for the lane change is caused by either (i) an instruction by a driver of the vehicle, (ii) a travel situation of the vehicle, or (iii) a road structure around the vehicle, the driving plan representing travel behavior of the vehicle until completion of the lane change and satisfying a safety condition that the vehicle will collide with none of the one or more objects detected around the vehicle,
set a completion condition indicating a position or time at which the completion of the lane change is required, based on either (a) a time elapsed since occurrence of the instruction, (b) a structure of a road being traveled by the vehicle, or (c) a situation of the road,
determine whether the completion condition is satisfied when the vehicle is driven according to the driving plan,
control the vehicle to make the lane change according to the driving plan when the completion condition is satisfied, and
restrict execution of the lane change when the completion condition is not satisfied.

2. The vehicle controller according to claim 1, wherein the processor relaxes the completion condition by extending the position or time at which the completion of the lane change is required when the driving plan satisfies a high-level safety condition compared to when the driving plan does not satisfy the high-level safety condition, the high-level safety condition requiring a higher level of safety of the vehicle than the safety condition.

3. The vehicle controller according to claim 1, wherein
when the instruction causes the request for the lane change, the processor sets the completion condition, based on the time elapsed since the occurrence of the instruction; and
when the travel situation of the vehicle or the road structure around the vehicle causes the request for the lane change, the processor sets the completion condition, based on the position at which the completion of the lane change is required.

4. The vehicle controller according to claim 1, wherein the processor is further configured to determine a degree of restriction of the lane change, depending on whether the completion condition is based on the time elapsed since the instruction, the structure of the road being traveled by the vehicle, or the situation of the road.

5. The vehicle controller according to claim 1, wherein the processor determines a first degree of restriction of the lane change for a first case in which the completion condition is determined not to be satisfied and may be satisfied after a predetermined period and determines a second degree of restriction of the lane change, different from the first degree of restriction, for a second case in which the completion condition is determined not to be satisfied and cannot be satisfied after the predetermined period.

6. A method for vehicle control that is executed by a processor, the method comprising:
detecting one or more objects in an area around a vehicle, based on a sensor signal obtained by a sensor mounted on the vehicle;
determining a driving plan for controlling a lane change from a host vehicle lane currently being traveled in by the vehicle to another lane when a request for the lane change is caused by either (i) an instruction by a driver of the vehicle, (ii) a travel situation of the vehicle, or (iii) a road structure around the vehicle, the driving plan representing travel behavior of the vehicle until completion of the lane change and satisfying a safety condition that the vehicle will collide with none of the one or more objects detected around the vehicle;
setting a completion condition indicating a position or time at which the completion of the lane change is required, based on either (a) a time elapsed since occurrence of the instruction, (b) a structure of a road being traveled by the vehicle, or (c) a situation of the road;
determining whether the completion condition is satisfied when the vehicle is driven according to the driving plan;
controlling the vehicle to make the lane change according to the driving plan when the completion condition is satisfied; and
restricting execution of the lane change when the completion condition is not satisfied.

7. A non-transitory recording medium that stores a computer program for vehicle control, the computer program causing a processor mounted on a vehicle to execute a process comprising:
- detecting one or more objects in an area around the vehicle, based on a sensor signal obtained by a sensor mounted on the vehicle;
- determining a driving plan for controlling a lane change from a host vehicle lane currently being traveled in by the vehicle to another lane when a request for the lane change is caused by either (i) an instruction by a driver of the vehicle, (ii) a travel situation of the vehicle, or (iii) a road structure around the vehicle, the driving plan representing travel behavior of the vehicle until completion of the lane change and satisfying a safety condition that the vehicle will collide with none of the one or more objects detected around the vehicle;
- setting a completion condition indicating a position or time at which the completion of the lane change is required, based on either (a) a time elapsed since the instruction, (b) a structure of a road being traveled by the vehicle, or (c) a situation of the road;
- determining whether the completion condition is satisfied when the vehicle is driven according to the driving plan;
- controlling the vehicle to make the lane change according to the driving plan when the completion condition is satisfied; and
- restricting execution of the lane change when the completion condition is not satisfied.

* * * * *